United States Patent
Engan et al.

(10) Patent No.: US 12,501,263 B2
(45) Date of Patent: Dec. 16, 2025

(54) AUTHENTICATE A USER BEFORE PERFORMING A SENSITIVE OPERATION ASSOCIATED WITH A UE IN COMMUNICATION WITH A WIRELESS TELECOMMUNICATION NETWORK

(71) Applicant: T-Mobile USA, Inc., Bellevue, WA (US)

(72) Inventors: Michael James Engan, Bellevue, WA (US); Nilesh Ranjan, Sammamish, WA (US); Julia Chanelle Buis, Bellevue, WA (US); Anjani Deepthi Nandigam, Bothell, WA (US); Savitha Venkata Rao, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 854 days.

(21) Appl. No.: 17/733,942

(22) Filed: Apr. 29, 2022

(65) Prior Publication Data
US 2023/0354027 A1    Nov. 2, 2023

(51) Int. Cl.
*H04W 12/06* (2021.01)
*G06V 30/18* (2022.01)
*G06V 40/16* (2022.01)
*G06V 40/20* (2022.01)
*G06V 40/40* (2022.01)

(52) U.S. Cl.
CPC .... *H04W 12/068* (2021.01); *G06V 30/18019* (2022.01); *G06V 40/172* (2022.01); *G06V 40/20* (2022.01); *G06V 40/40* (2022.01)

(58) Field of Classification Search
CPC ..... H04W 12/068; G06V 40/72; G06V 40/40; G06V 40/20; G06V 30/18019
USPC .............................................. 455/411
See application file for complete search history.

(56) References Cited

U.S. PATENT DOCUMENTS

| 7,653,818 | B2 | 1/2010 | Serpa |
| 7,904,478 | B2 | 3/2011 | Yu et al. |
| 7,941,834 | B2 | 5/2011 | Beck et al. |

(Continued)

FOREIGN PATENT DOCUMENTS

| CN | 106453341 A | 2/2017 |
| CN | 111736821 A | 10/2020 |

(Continued)

*Primary Examiner* — William Nealon
(74) *Attorney, Agent, or Firm* — Perkins Coie LLP (57) ABSTRACT

The system receives an indication of a sensitive operation. The system obtains a unique ID of a user's UE. Based on the unique ID of the UE, the system retrieves a visual authentication method including a visual ID. The system records the visual ID, and retrieves a corresponding stored visual ID. The system performs a liveness check associated with the visual ID, to determine whether the visual ID is a recording or a live version of the visual ID. Upon determining that the visual ID is the recording, the system refuses to authenticate the user. Upon determining that the visual ID is the live version of the visual ID, the system compares the visual ID and the corresponding stored visual ID to determine whether the visual ID and the corresponding stored visual ID match. Upon determining that the visual ID and the corresponding stored visual ID match, the system authenticates the user.

17 Claims, 7 Drawing Sheets

(56) References Cited

U.S. PATENT DOCUMENTS

| | | | |
|---|---|---|---|
| 8,261,090 B1* | 9/2012 | Matsuoka | H04L 63/08 |
| | | | 715/764 |
| 8,645,993 B2 | 2/2014 | Perry | |
| 8,687,039 B2 | 4/2014 | Degrazia et al. | |
| 8,781,079 B2 | 7/2014 | Hao et al. | |
| 8,781,856 B2 | 7/2014 | Hanina et al. | |
| 8,787,969 B2 | 7/2014 | Chava et al. | |
| 8,793,702 B2 | 7/2014 | Kim et al. | |
| 8,818,081 B1 | 8/2014 | Lookingbill et al. | |
| 8,849,821 B2 | 9/2014 | Schloter | |
| 8,897,484 B1 | 11/2014 | Fredinburg et al. | |
| 8,941,741 B1 | 1/2015 | Mcdonough et al. | |
| 9,025,016 B2 | 5/2015 | Wexler et al. | |
| 9,223,589 B2 | 12/2015 | Young | |
| 9,223,959 B2 | 12/2015 | Hosabettu et al. | |
| 9,288,226 B2 | 3/2016 | Ben-itzhak et al. | |
| 9,432,421 B1 | 8/2016 | Mott et al. | |
| 9,432,633 B2 | 8/2016 | Martin et al. | |
| 9,571,623 B2 | 2/2017 | Schultz et al. | |
| 9,619,017 B2 | 4/2017 | Samanta Singhar | |
| 9,652,745 B2 | 5/2017 | Taylor et al. | |
| 9,710,128 B2 | 7/2017 | Kauffmann | |
| 9,746,913 B2 | 8/2017 | Lam et al. | |
| 9,792,259 B2 | 10/2017 | Heinz et al. | |
| 9,870,500 B2 | 1/2018 | Dimitriadis et al. | |
| 9,888,842 B2 | 2/2018 | White et al. | |
| 9,965,612 B2 | 5/2018 | Teichman | |
| 10,069,967 B2 | 9/2018 | Hodge | |
| 10,108,961 B2 | 10/2018 | Wang et al. | |
| 10,146,923 B2 | 12/2018 | Pitkänen et al. | |
| 10,157,504 B1 | 12/2018 | Jain | |
| 10,169,055 B2 | 1/2019 | Eska | |
| 10,191,957 B2 | 1/2019 | Lock et al. | |
| 10,192,175 B2 | 1/2019 | Blyumen | |
| 10,205,643 B2 | 2/2019 | Fletcher et al. | |
| 10,235,428 B2 | 3/2019 | Varadarajan et al. | |
| 10,346,605 B2 | 7/2019 | Narasimhan | |
| 10,551,915 B2 | 2/2020 | Kristensson et al. | |
| 10,691,946 B2 | 6/2020 | Zhan et al. | |
| 10,721,192 B2 | 7/2020 | Wei | |
| 10,764,301 B2 | 9/2020 | Chen | |
| 10,896,214 B2 | 1/2021 | Kummamuru et al. | |
| 10,915,520 B2 | 2/2021 | True et al. | |
| 11,205,220 B2 | 12/2021 | Sampson et al. | |
| 11,256,914 B2 | 2/2022 | Le Henaff | |
| 2012/0185393 A1 | 7/2012 | Atsmon et al. | |
| 2012/0254810 A1 | 10/2012 | Heck et al. | |
| 2015/0012426 A1 | 1/2015 | Purves et al. | |
| 2015/0049922 A1* | 2/2015 | Miller | H04W 12/068 |
| | | | 382/118 |
| 2015/0123897 A1 | 5/2015 | Takahagi et al. | |
| 2015/0289137 A1* | 10/2015 | Yang | H04W 12/06 |
| | | | 455/411 |
| 2016/0057624 A1* | 2/2016 | Yang | H04W 4/60 |
| | | | 455/411 |
| 2016/0139662 A1 | 5/2016 | Dabhade | |
| 2017/0279957 A1 | 9/2017 | Abramson et al. | |
| 2018/0261116 A1 | 9/2018 | Tsyrina | |
| 2019/0014149 A1 | 1/2019 | Cleveland et al. | |
| 2020/0073483 A1 | 3/2020 | Berenzweig et al. | |
| 2021/0019541 A1 | 1/2021 | Wang et al. | |
| 2021/0029389 A1 | 1/2021 | Zhang et al. | |
| 2021/0201029 A1 | 7/2021 | Ju et al. | |
| 2021/0280059 A1 | 9/2021 | Fiszer et al. | |
| 2022/0051301 A1 | 2/2022 | Forutanpour et al. | |
| 2022/0322083 A1* | 10/2022 | Kreishan | H04W 12/0431 |

FOREIGN PATENT DOCUMENTS

| | | |
|---|---|---|
| DE | 102009038879 A1 | 3/2011 |
| DE | 102015005731 A1 | 11/2016 |
| EP | 2801065 A1 | 11/2014 |
| EP | 3099078 A1 | 11/2016 |
| JP | 6069378 B2 | 1/2017 |
| JP | 6628876 B2 | 12/2019 |
| JP | 2020522826 A | 7/2020 |
| KR | 101486496 B1 | 2/2015 |
| KR | 101759415 B1 | 7/2017 |
| WO | 2016004330 A1 | 1/2016 |
| WO | 2017218194 A1 | 12/2017 |
| WO | 2018092016 A1 | 5/2018 |
| WO | 2018104834 A1 | 6/2018 |
| WO | 2018175328 A1 | 9/2018 |
| WO | 2019014620 A1 | 1/2019 |
| WO | 2020148658 A2 | 7/2020 |

* cited by examiner

AUTHENTICATE A USER BEFORE PERFORMING A SENSITIVE OPERATION ASSOCIATED WITH A UE IN COMMUNICATION WITH A WIRELESS TELECOMMUNICATION NETWORK

BACKGROUND

A SIM swap scam (also known as port-out scam, SIM splitting, Smishing and simjacking, SIM swapping) is a type of account takeover fraud that generally targets a weakness in two-factor authentication and two-step verification in which the second factor or step is a text message (short message service, or SMS) or call placed to a mobile telephone. The fraud exploits a mobile phone service provider's ability to seamlessly port a phone number to a device containing a different subscriber identity module (SIM). This mobile number portability feature is normally used when a phone is lost or stolen, or when a customer is switching service to a new phone.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to authenticate a user before performing a SIM swap, or an eSIM swap, in a mobile device associated with a wireless telecommunication network. The system can receive an indication of a sensitive operation such as a request to perform the eSIM swap. The system can obtain a unique identifier (ID) of a mobile device associated with the user, where the unique ID comprises an international mobile subscriber identity (IMSI), a phone number associated with the mobile device, or other unique ID. Based on the unique ID of the mobile device, the system can retrieve a visual authentication method including a visual ID. The visual ID can include an ID associated with the user or the user's face.

The system can record the visual ID, and retrieve a corresponding stored visual ID. The system can perform a liveness check associated with the visual ID, where the liveness check determines whether the visual ID is a recording or a live version of the visual ID. A recording of the visual ID can be a previously taken image of somebody else's ID, or somebody else's face. The recording can be used to fraudulently impersonate another user. Upon determining that the visual ID is the recording, the system can refuse to authenticate the user. Upon determining that the visual ID is the live version of the visual ID, the system can compare the visual ID and the corresponding stored visual ID to determine whether the visual ID and the corresponding stored visual ID match. Upon determining that the visual ID and the corresponding stored visual ID match, the system can authenticate the user.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
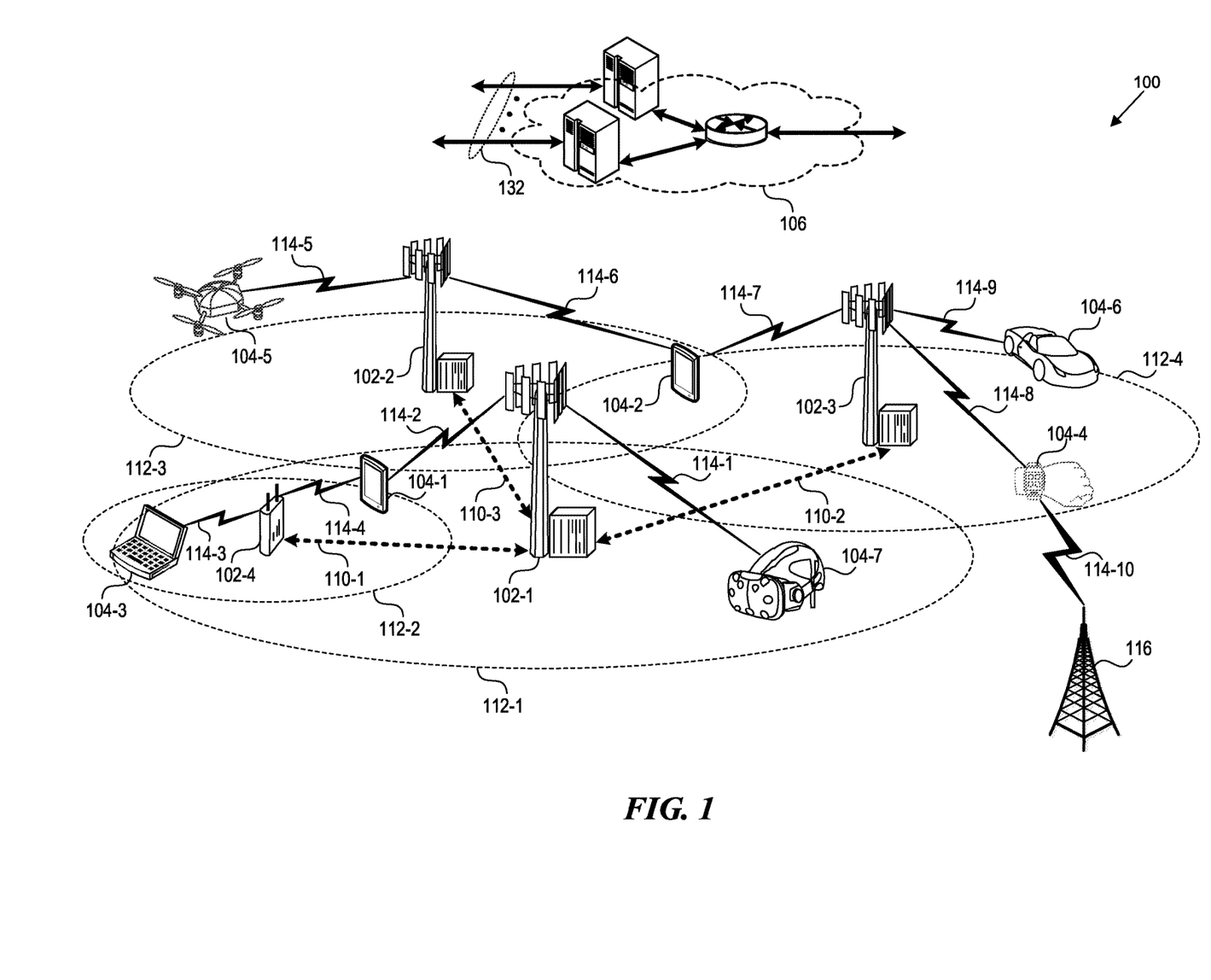
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
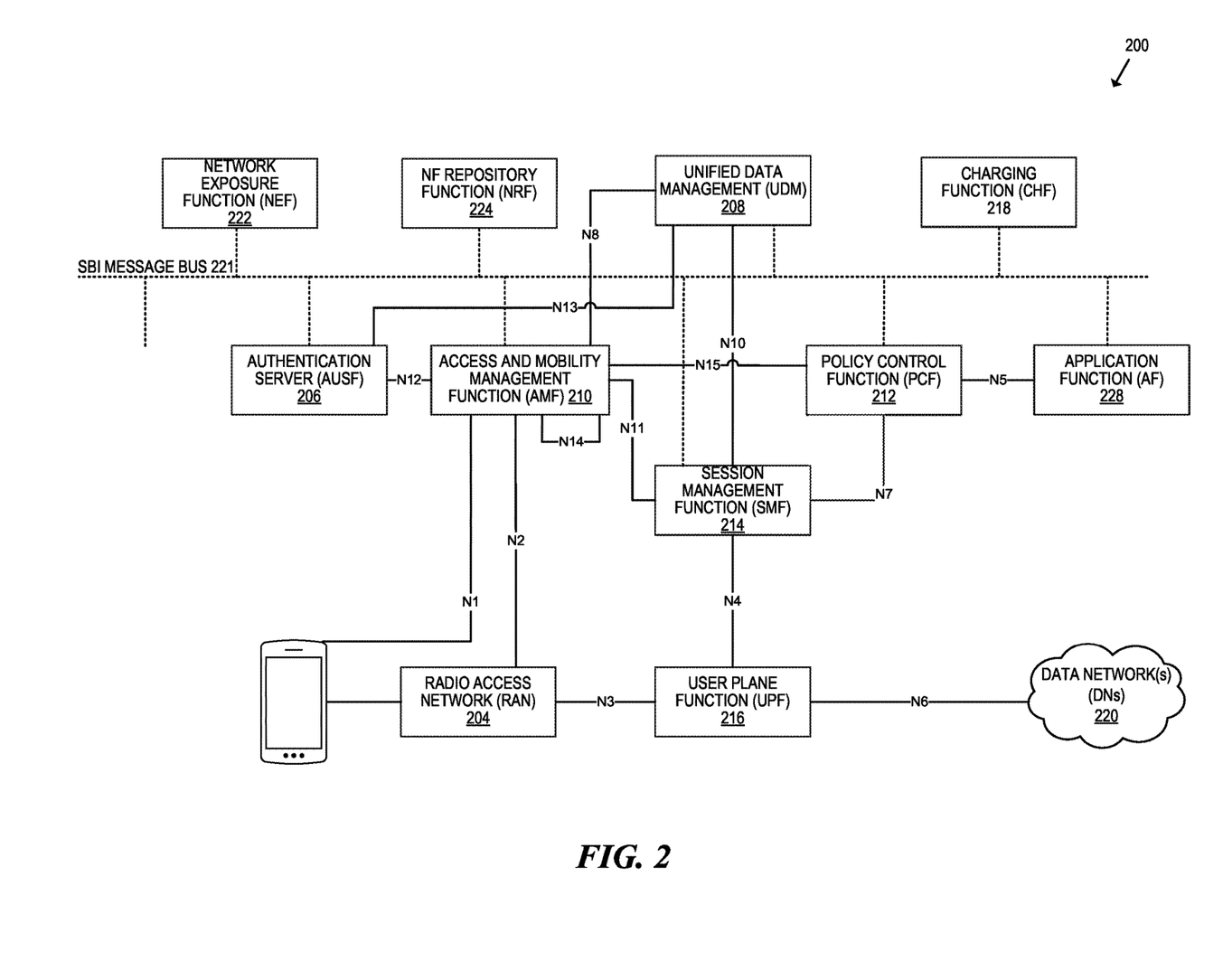
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a Radio Access Network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service and charging rules, includes network slice selection, which is regulated by the NSSF 226.

Figure 3:
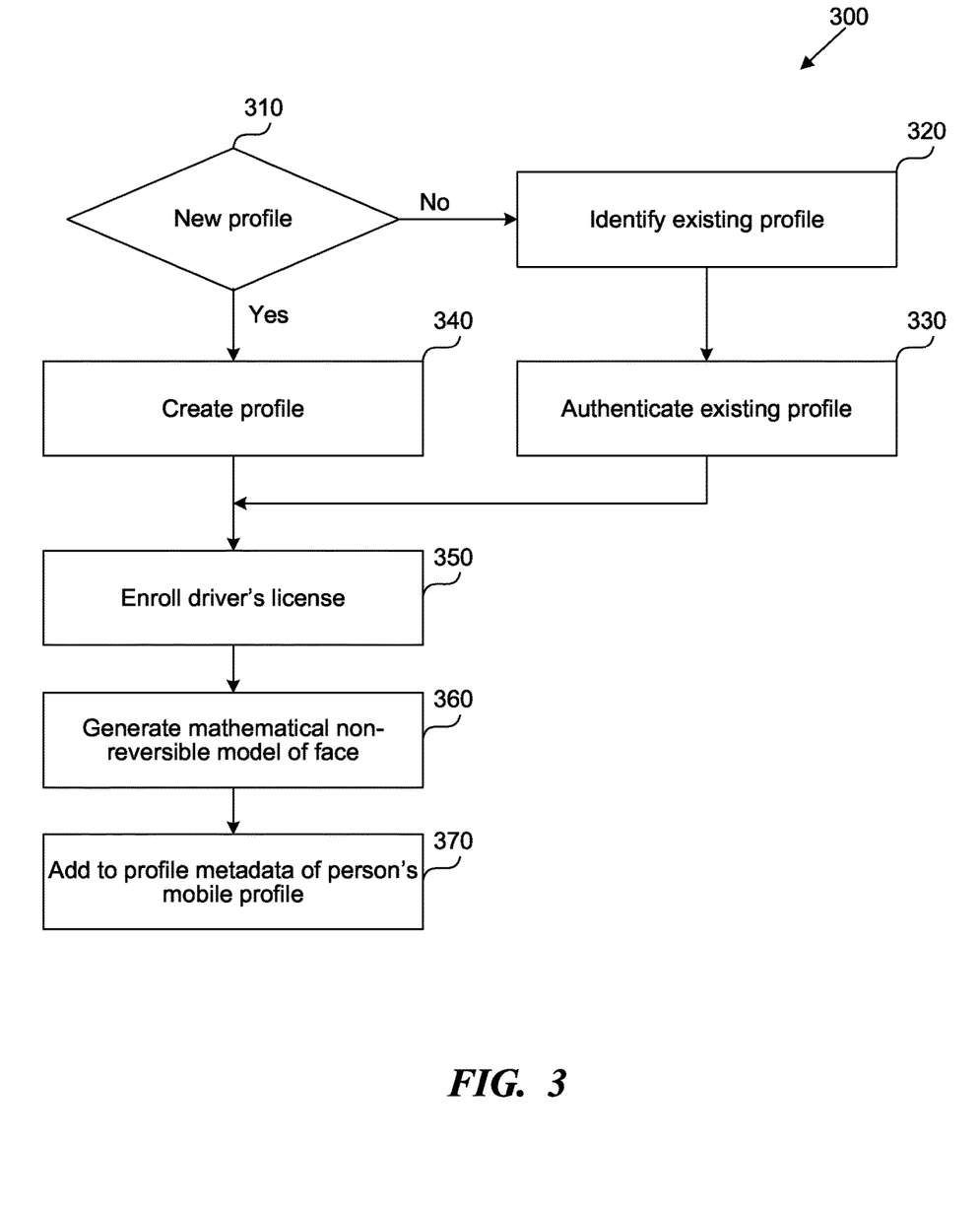
FIG. 3 is a flow diagram of enrolling the user in the secure embedded-SIM (eSIM) swap authentication process.

Authenticate a User Before Performing a Sensitive Operation Associated with a UE in Communication with a Wireless Telecommunication Network FIG. 3 is a flow diagram of enrolling the user in the secure eSIM swap authentication process. An embedded-SIM (eSIM), or embedded universal integrated circuit card (eUICC), is a form of programmable subscriber identity module (SIM) that is embedded directly into a device. Unlike a physical SIM card that is manually inserted into a device, an eSIM is permanently mounted to the surface of a mobile device at the factory. The use of eSIM technology improves reliability and network security, while also reducing space requirements and increasing design flexibility, since a relatively bulky connector is not needed.

The disclosed system enables users to securely swap eSIMs between two different UEs, for example, when upgrading from one UE to another. Currently, users can switch their eSIMs when both the old UE and the new UE are present side by side. The users can authenticate themselves using traditional methods such as passwords, however, passwords are easily forgotten, especially in use cases such as eSIM swaps which happen once every couple of years. Using the technology disclosed here, the users can authenticate themselves without the need for a password. Diagram 300 shows the steps that a hardware or software processor can perform to enroll the user in a program that enables secure swap of eSIMs.

In step 310, the processor can determine whether the system needs to create a new user profile, or whether there is an existing user profile to which the system needs to add an additional authentication. In step 320, the processor can identify an existing user profile. In step 330, the processor can authenticate the user using a traditional authentication method, such as a password. In step 340, the system can create a new profile.

Step 350 can occur after step 330, or after step 340, depending on whether the system is creating a new profile, or adding an authentication to an existing profile. In step 350, the processor can receive a photo of the front of the user's identification (ID), the back of the user's ID, and a selfie. The ID can include a driver's license, a passport, or other government-issued ID. The selfie can allow the processor to verify that the person present matches the person represented by the ID. In addition, the selfie can be used in facial authentication.

The processor can perform optical character recognition (OCR) on the ID, and extract text from the front and the back of the ID. For example, the processor can extract the barcodes contained on the back of the ID, and compare data contained in the barcodes on the ID to the data obtained from the front of the ID. If the date on the front of the ID does not match the date on the back of the ID, the indication is that the ID is a fraud. If the date on the front matches the date on the back, the indication is that the ID is valid. In another example, if the ID is a California driver's license, the processor can check the information obtained from the user with a database of the state of California. For example, information obtained from the user can include the driver's license number, the first name, the last name, the issue date, and the expiration date. The database from the state of California can confirm that such a driver's license containing the supplied information exists. The confirmation can authenticate the user, and indicate that the driver's license is not a fake.

In step 360, the processor can generate a mathematical non-reversible model of a face. The processor does not store a JPG of the person's face, and does not store a mathematical model that would allow the processor to use artificial intelligence to create an artificial face.

In step 370, the processor can create a profile or add to an existing profile the metadata about the ID. The profile can be already associated with the network 100 in FIG. 1. The network 100 knows the identity of the UE that is enrolling the user. The identity can be the IMSI, a number that uniquely identifies every UE on the network 100. The identity can be the phone number of the UE. For example, if the user is taking a photo of the driver's license, and the IMSI of the UE is 313 460 000 000 001, the network 100 adds the driver's license to the profile for UE 313 460 000 000 001. Consequently, the network 100 can uniquely combine device authentication, device identity, and device profile. For example, the network 100 knows that the UE 313 460 000 000 001 is the device with which the user took photos and enrolled the user's driver's license. If the user tries to authenticate the same information from a different UE, the network 100 can refuse the authentication, even if the driver's license information is valid. Consequently, the network 100 can provide strong authentication by requiring a particular UE to do the authentication.

The metadata can include information such as the date the ID scan was performed, whether the processor got a response from the state, the address of the user, the name of the user, the ID number such as the driver's license number, etc. Additional information contained on the driver's license such as height, weight, eye color, and organ donor status may or may not be stored within the profile. The profile so obtained is unique and includes information associated with the scanned ID as well as the mathematical model of the user's face. The profile can also have other authenticators such as a password, an email address of the user, a phone number of the user, a fingerprint associated with the user, security questions, etc.

Certain phone numbers associated with certain users may not be authorized to use the authentication process described in this application. For example, a phone number can be part of a family plan, and can be associated with a child who may or may not have a government ID, or may or may not have parental authorization to perform an eSIM swap. Consequently, certain users may be excluded from using an authentication method described in this application.

Figure 4:
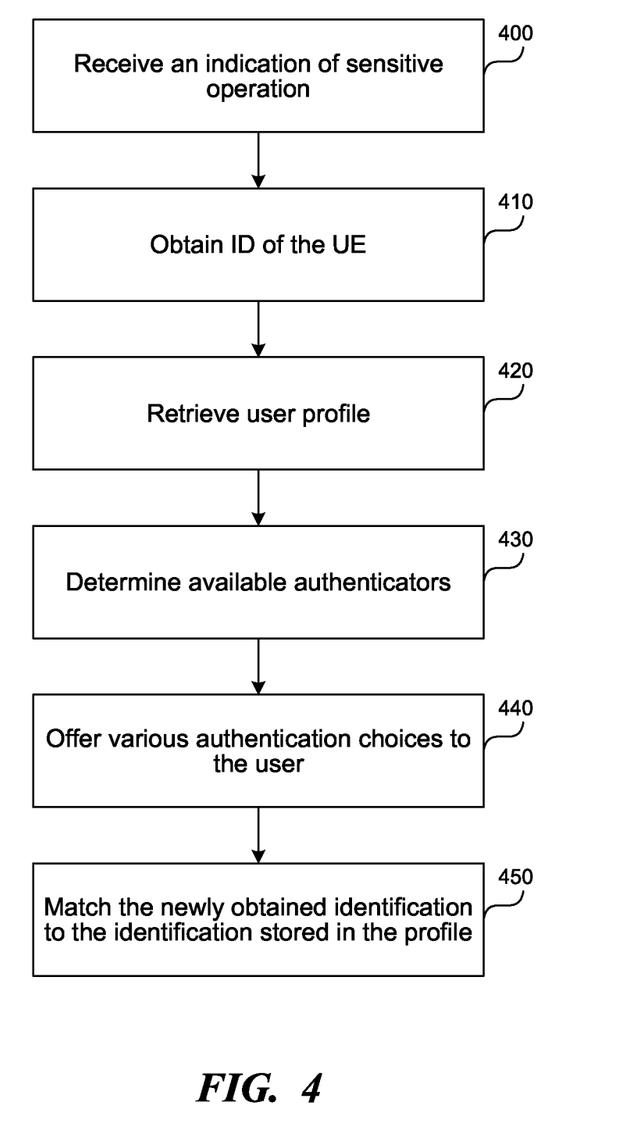
FIG. 4 is a flow diagram of authenticating the user prior to performing the eSIM swap.

FIG. 4 is a flow diagram of authenticating the user prior to performing the eSIM swap. In step 400, the processor can receive an indication of a sensitive operation a user wants to perform such as an eSIM swap or changing a billing plan. In the eSIM swap, the user can receive a new UE, and may want to transfer the phone number of the old UE to the new UE. The old UE can be the device that enrolled the user in the authentication program. To change the billing plan, the user can open a software application associated with the network 100 in FIG. 1, which recognizes the UE's number, and can show the current account associated with the UE's number in a read only mode. If the user wants to change the billing plan, such as by buying a new phone or adding a line, the user can scan an ID to "authenticate" since the ID has the same data as the primary account holder/account owner. In this way the user need not even create an account with a password.

In step 410, the processor can obtain the ID of the UE. The processor can obtain the ID of the device directly from the UE, or the processor can ask for the username, and can identify the UE based on the username.

In step 420, based on the UE, the processor can retrieve the user profile. In step 430, the processor can determine what authenticators are available. In step 440, the processor can offer various authentication choices to the user. For example, if the profile contains a password, the processor can offer to use the password as the authentication method. If the profile contains an email address, the processor can offer to send a one-time password to the email address as the authentication method. If the profile contains a fingerprint, the processor can offer to use the fingerprint as the authentication method. If the profile contains a photo of an ID, the processor can offer to use the ID as the authentication method. If the profile contains a selfie of the user, the processor can offer to use face authentication as the authentication method.

With an ID, the processor can perform three various authentications. First, the processor can check that the face depicted in the ID face today matches the face depicted in the stored ID. Second, the processor can check that the data contained in the ID scanned today matches data from the stored ID. Third, the processor can check that the data contained in the ID scanned today matches the billing name and billing address from account creation, even if the billing name and billing address are entered as text, and no stored ID with the billing information exists.

If the user chooses to use an ID as the authentication method, the processor can perform a liveness check. In a liveness check, the processor tries to determine whether the user is presenting a photo of an ID, or the real ID. In one embodiment, to perform a liveness check, a trusted camera software can take a picture of the ID. In another embodiment, the processor, instead of taking a photo, can take a short video such as a one-second video, and determine whether the ID is moving around a little bit, and/or whether the pitch and angle of the item move around a little bit. In a third embodiment, the liveness check can include whether the image has a bit of a keystone, which is an apparent distortion of an image due to the projection onto an angled surface. Keystone is a form of perspective distortion and can make a rectangle look like a trapezoid. In a fourth embodiment, the liveness check can include a detection of a shifting glare on a driver's license, because glare indicates a presence of a hologram. A hologram is impossible to render on a print, or a photocopy. Consequently, detection of a shifting glare indicates that the presented ID is a real ID, and not a photo of an ID. The processor performing the liveness check can use the image headers of the ID image and check that the same camera hardware recorded both the selfie image and the ID image.

Similarly, if the user chooses selfie as an authentication method, the processor can record a short video, and during the recording of the video, the processor can direct the user to turn the head to the left or to the right, or to blink. If the video records the user performing instructions, the video indicates that the user is taking the video live, as opposed to presenting a picture of someone else.

In step 450, the processor can match the newly obtained identification to the identification stored in the profile. If the authentication is based on the user's face, the processor can create a mathematical model of the newly recorded face and compare to the mathematical model of the face stored in the profile. If the authentication is based on the user's ID, the processor can perform the optical character recognition (OCR) on the ID, extract information from the ID, and compare to the stored information. To identify the user based on the ID, the processor can have threshold requirements. For example, if the user has moved and the address has changed, the processor can authenticate the user, as long as the city is the same, the name is the same, and the driver's license number is the same. If the user changes their name, the processor can refuse authentication.

Users that have historically been subject to fraud, or identity theft, can use the described authentication method to authenticate themselves without the help of a third party. Currently, those users have to call a special team and use a special pre-saved authentication vector, like a verbal code or a verbal password, to authenticate themselves and perform a SIM swap or an eSIM swap. Using the disclosed system, those users can take a selfie, or provide their ID, such as a passport or driver's license, and use the described system to perform an eSIM swap, without the need to call the special team for authentication.

The network 100 can require the enhanced authentication as described in this application for certain user requests. For example, if the user is placing a large order, such as a dozen iPhones, the network 100 can request the user to authenticate using the ID and/or facial authentication, as described here. In another example, if the user wants to suspend cellular service for a month, the network 100 can request the user to authenticate using the enhanced authentication described in this application.

Even if the user has not enrolled in the heightened authentication, the user can enroll the first time the heightened authentication as described in this application is used. For example, the user can present an ID for authentication, even if the processor has not stored a previous version of the ID. In that case, the processor can extract information from the ID, such as the username and address, and can compare the extracted information to the user information stored in the network 100. If the information contained in the ID and the information contained in the user profile in the network match, the user can be authenticated, and the ID can be stored for future authentication.

Currently, users can switch their eSIMs when both the old UE and the new UE are present side by side. Using the current technology, a user can perform an eSIM swap even when the user does not have access to their old UE. To do this, the user can use the new UE, then authenticate themselves using ID or facial scan, and the network 100, which stores the authentication information in the user profile, can authenticate the user. Subsequently, the network 100 can perform the eSIM swap.

In another example, the user can use the authentication described in this application when the old UE and the new UE are different, and cannot communicate with each other using Bluetooth communication. For example, the user can send the authentication information, such as the user ID or facial scan, to the network 100 using either the old UE or the new UE, and the network 100 can authenticate the user. Subsequently, the network 100 can perform the eSIM swap to the new UE. In this scenario, the network 100 is effectively acting as a communicator between the old UE and the new UE.

Figure 5:
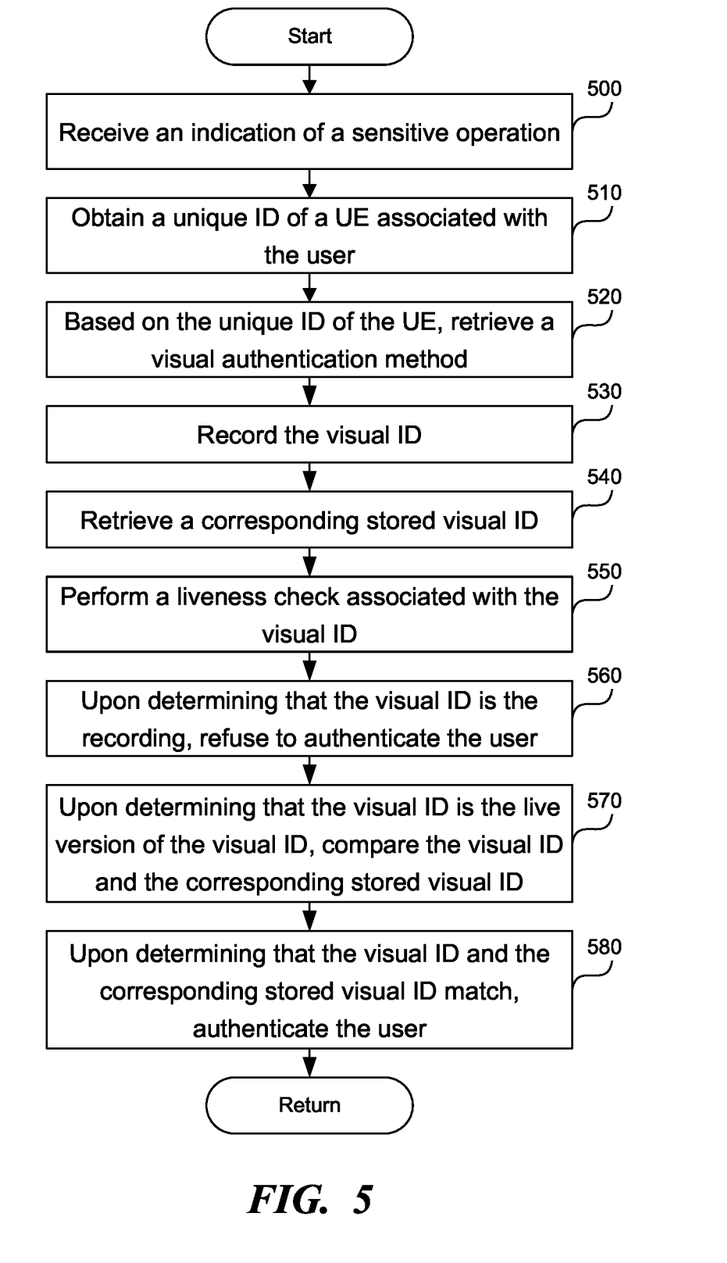
FIG. 5 is a flowchart of a method to authenticate a user before performing a sensitive operation associated with a user equipment (UE) in communication with a wireless telecommunication network.

FIG. 5 is a flowchart of a method to authenticate a user before performing a sensitive operation associated with a UE in communication with a wireless telecommunication network. In step 500, a hardware or software processor performing instructions described in this application can receive an indication of a sensitive operation, such as a request to perform an eSIM swap, a SIM swap, a blocked operation from users placed on fraud alert, or an operation that requires a heightened level of authentication. An operation requiring the heightened level of authentication can include a large purchase or a significant change to the configuration of the UE or the service provided to the UE by the wireless telecommunication network.

In step 510, the processor can obtain a unique ID of a UE associated with the user. The unique ID can include an IMSI or a phone number associated with the UE.

In step 520, based on the unique ID of the UE, the processor can retrieve a visual authentication method including a visual ID. The visual ID can be an ID associated with the user or the user's face.

In step 530, the processor can record the visual ID. In step 540, the processor can retrieve a corresponding stored visual ID, which can be stored during the enrollment phase, as described in this application.

In step 550, the processor can perform a liveness check associated with the visual ID, where the liveness check determines whether the visual ID is a recording or a live version of the visual ID. The liveness check can prevent the user from providing a still image of somebody else's driver's license or providing a photograph of somebody else's face.

In one embodiment, to perform the liveness check, the processor can record a video of the visual ID. The processor can determine whether the visual ID is an image by instructing the user to perform a predetermined action associated with the user's head, such as blinking, or moving the head left to right or up and down. Based on the video, the processor can determine whether the user is performing the predetermined action. Upon determining that the user is performing the predetermined action, the processor can determine that the visual ID is the live version of the visual ID.

In another embodiment, to perform the liveness check, the processor can record a video of the visual ID. The processor can determine whether the visual ID is an image by detecting a presence of a hologram in the visual ID. To detect the presence of the hologram, the processor can detect a shifting glare on a surface of the ID in the video. Upon detecting the shifting glare on the surface of the ID in the video, the processor can determine that the visual ID is a live version of the visual ID.

In a third embodiment, to perform the liveness check, the processor can record a video of the visual ID. The processor can determine whether the visual ID is an image by detecting movements associated with the visual ID within the video. The movements can be due to the movement of the camera or due to the movement of the visual ID, but in either case, the movements are not present in a still image. Upon detecting the movements associated with the visual ID within the video, the processor can determine that the visual ID is a live version of the visual ID.

In step 560, upon determining that the visual ID is the recording, the processor can refuse to authenticate the user. In step 570, upon determining that the visual ID is the live version of the visual ID, the processor can compare the visual ID and the corresponding stored visual ID to determine whether the visual ID and the corresponding stored visual ID match. For example, the processor can perform facial recognition.

In step 580, upon determining that the visual ID and the corresponding stored visual ID match, the processor can authenticate the user, and consequently authorize the user to perform the requested operation.

The processor can enroll the user in the authentication process while authenticating the user, without requiring the user to perform a separate enrollment process. To do that, the processor can receive a visual recording of the ID associated with the user. The visual recording can be an image or a video. The ID can be a form of a government ID such as a driver's license, or a passport. The processor can perform optical character recognition associated with the visual recording. Based on the optical character recognition, the processor can extract information about the user including a name associated with the user, and a visual representation associated with the user. The visual representation can be an image or a video. The processor can retrieve a stored name associated with the user, and a stored visual representation associated with the user. The processor can determine whether the name associated with the user and the stored name associated with the user match. The processor can determine whether the visual representation associated with the user and the stored visual representation associated with the user match. Upon determining that the name associated with the user and the stored name associated with the user match, and that the visual representation associated with the user and the stored visual representation associated with the user match, the processor can store the visual recording of the ID associated with the user and can authenticate the user.

The processor can authenticate the user using facial recognition. The processor can receive a visual recording of the user's face. The processor can transform the visual recording of the user's face into a mathematical non-reversible model of the user's face. The processor can retrieve a stored mathematical non-reversible model of a face. The processor can determine whether the mathematical non-reversible model of the user's face and the stored mathematical non-reversible model of the face match by comparing the mathematical non-reversible model of the user's face and the stored mathematical non-reversible model of the face. Upon determining that the mathematical non-reversible model of the user's face and the stored mathematical non-reversible model of the face match, the processor can authenticate the user.

The processor can offer various authentication methods to the user. The processor can retrieve authenticators associated with the user, and the authenticators can include a password, an email address associated with the user, a fingerprint associated with the user, a photo of the ID associated with the user, and/or a facial representation associated with the user. The processor can enable the user to select at least one of the authenticators associated with the user. The processor can receive an authenticator selection from the user. The processor can authenticate the user based on the authenticator selection.

Figure 6:
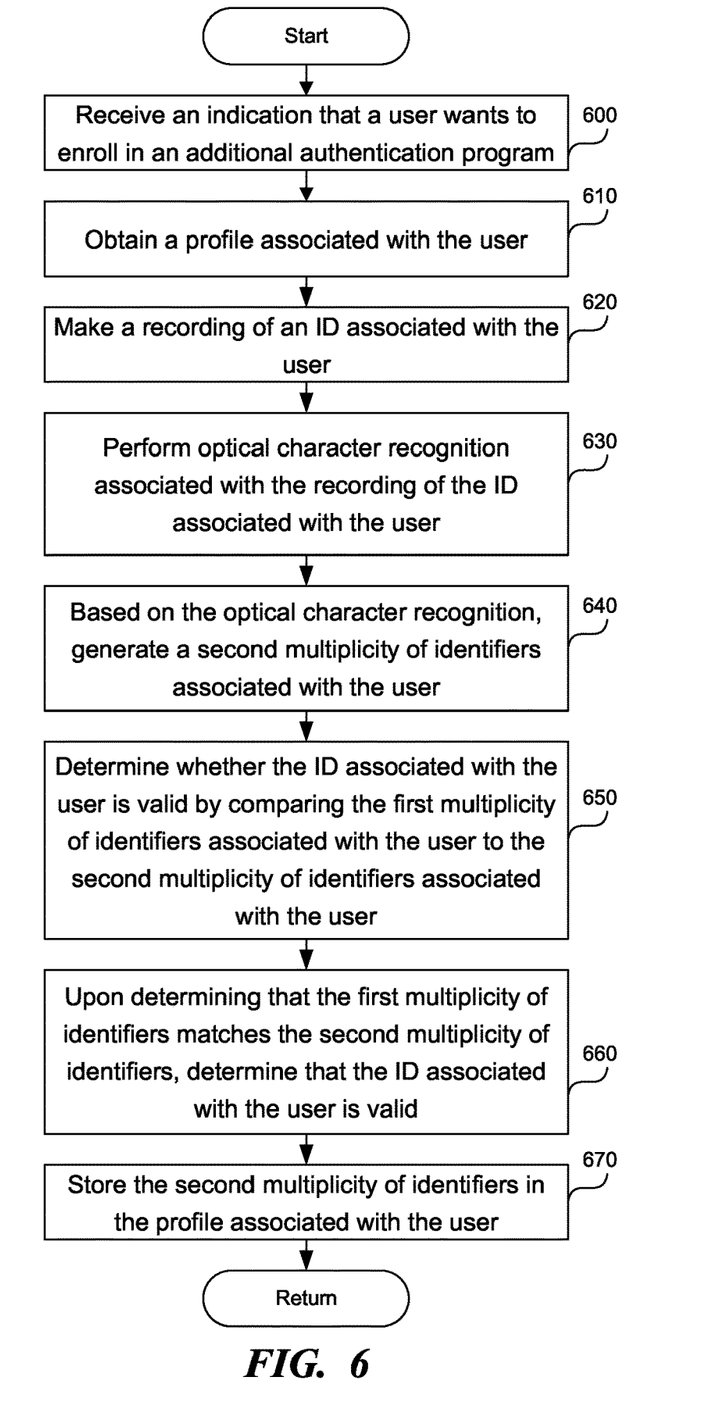
FIG. 6 is a flowchart of a process to enroll the user in an authentication process.

FIG. 6 is a flowchart of a process to enroll the user in an authentication process. In step 600, the processor can receive an indication that a user wants to enroll in an additional authentication program. In step 610, the processor can obtain a profile associated with the user, where the profile includes a first multiplicity of identifiers associated with the user such as name, address, and phone number.

In one embodiment, to obtain a profile associated with the user, the processor can create a new profile. To do that, the processor can determine whether the profile associated with the user exists within a wireless telecommunication network. Upon determining that the profile associated with the user does not exist within the wireless telecommunication network, the processor can create a new profile associated with the user.

In another embodiment, to obtain a profile associated with the user, the processor can identify an existing profile. The processor can determine whether the profile associated with the user exists within a wireless telecommunication network. Upon determining that the profile associated with the user exists within the wireless telecommunication network, the processor can authenticate that the user is authorized to modify the profile.

In step 620, the processor can make a recording of an ID associated with the user. The ID can be a government-issued ID such as a driver's license, passport, birth certificate, etc.

In step 630, the processor can perform optical character recognition associated with the recording of the ID associated with the user. In step 640, the processor can, based on the optical character recognition, generate a second multiplicity of identifiers associated with the user, where the second multiplicity of identifiers at least partially overlaps the first multiplicity of identifiers. In other words, the first multiplicity of identifiers and the second multiplicity of identifiers can have some of the same identifiers such as name of the user or address of the user, but can also have some different identifiers. For example, the second multiplicity of identifiers associated with the user obtained from the driver's license can include information about the user such as height, weight, hair color, eye color, and/or photo, while the first multiplicity of identifiers does not contain that information.

In step 650, the processor can determine whether the ID associated with the user is valid by comparing the first multiplicity of identifiers associated with the user to the second multiplicity of identifiers associated with the user to determine whether the first multiplicity of identifiers matches the second multiplicity of identifiers.

In step 660, upon determining that the first multiplicity of identifiers matches the second multiplicity of identifiers, the processor can determine that the ID associated with the user is valid. In step 670, the processor can store the second multiplicity of identifiers in the profile associated with the user.

The processor can verify the veracity of the ID, in other words, that the ID is not fraudulent. In one embodiment, the processor can extract a barcode contained in the recording of the ID. The processor can extract text contained in the recording of the ID. The processor can compare information included in the barcode to information included in the text. The processor can determine whether the information included in the barcode does not match the information included in the text. Upon determining that the information included in the barcode does not match the information included in the text, the processor can determine that the ID associated with the user is a fraud. Upon determining that the information included in the barcode matches the information included in the text, the processor can determine that the ID associated with the user is valid.

In another embodiment, to verify the veracity of the ID, the processor can, based on the optical character recognition, determine an entity issuing the ID associated with the user, such as the state of California, Department of Justice, vital records, etc. The processor can retrieve from a database associated with the entity a third multiplicity of identifiers associated with the user. The processor can determine whether the second multiplicity of identifiers and the third multiplicity of identifiers match by comparing the second multiplicity of identifiers associated with the user to the third multiplicity of identifiers associated with the user. Upon determining that the second multiplicity of identifiers and the third multiplicity of identifiers match, the processor can determine that the ID associated with the user is valid. For example, if the ID is a California driver's license, the processor can check the information obtained from the user with a database of the state of California. For example, information obtained from the user can include the driver's license number, the first name, the last name, the issue date, and the expiration date. The database from the state of California can confirm that such a driver's license containing the supplied information exists. The confirmation can authenticate the user, and indicate that the driver's license is not a fake.

The processor can enroll the user in the authentication program based on a selfie. The processor can obtain a recording of the user's face, such as an image or a video. The processor can generate a mathematical non-reversible model of the user's face based on the recording. The processor can store the mathematical non-reversible model of the user's face in the profile associated with the user.

Computer System

Figure 7:
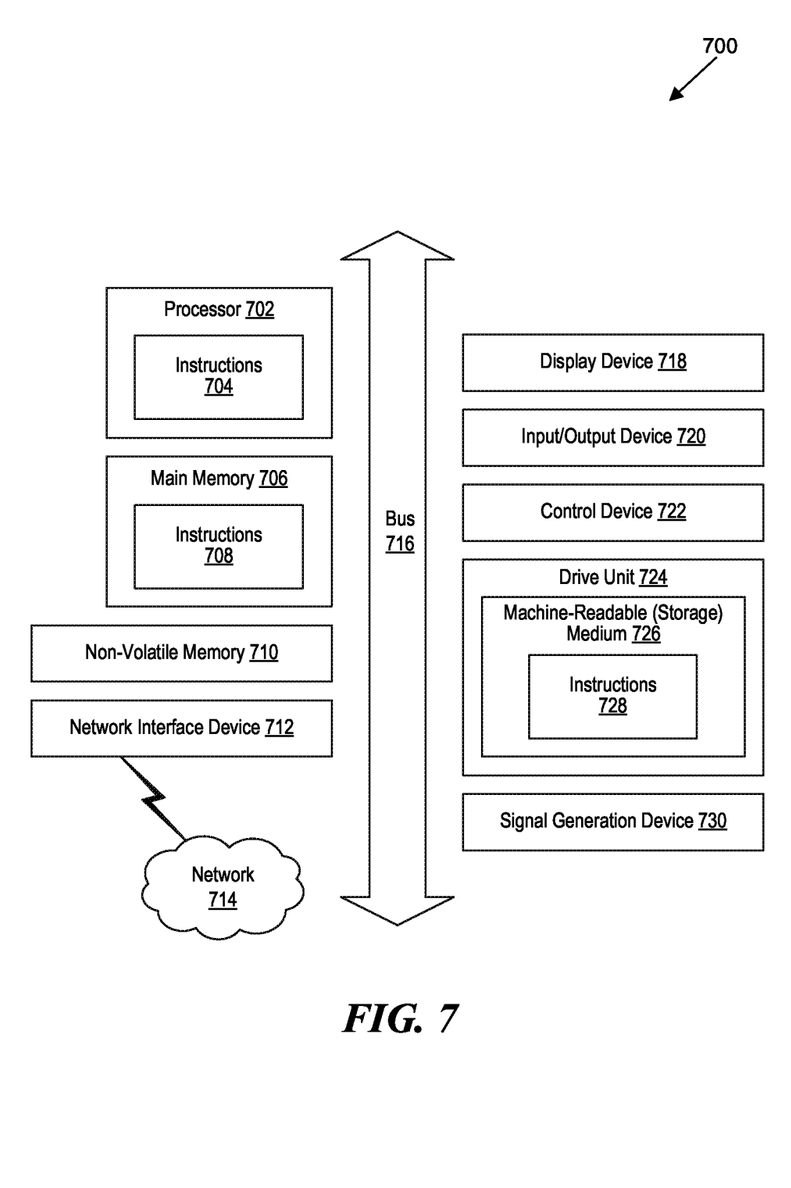
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the Figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one computer-readable storage medium, excluding transitory signals and carrying instructions to authenticate a user before performing an eSIM swap in a mobile device associated with a wireless telecommunication network, which, when executed by at least one data processor of a system, cause the system to:
   receive an indication of a sensitive operation,
      wherein the sensitive operation includes a request to perform the eSIM swap;
   obtain a unique ID of a mobile device associated with the user,
      wherein the unique ID comprises an IMSI or a phone number associated with the mobile device;
   based on the unique ID of the mobile device, retrieve a visual authentication method,
      wherein the visual authentication method includes a visual ID,
      wherein the visual ID includes an ID associated with the user or the user's face;
   record the visual ID;
   retrieve a corresponding stored visual ID;
   perform a liveness check associated with the visual ID,
      wherein the liveness check determines whether the visual ID is a recording or a live version of the visual ID, by:

recording a video of the visual ID;
determining whether the visual ID is an image by detecting movements associated with the visual ID within the video; and
upon detecting the movements associated with the visual ID within the video, determine that the visual ID is a live version of the visual ID;
upon determining that the visual ID is the recording, refuse to authenticate the user;
upon determining that the visual ID is the live version of the visual ID, compare the visual ID and the corresponding stored visual ID to determine whether the visual ID and the corresponding stored visual ID match; and
upon determining that the visual ID and the corresponding stored visual ID match, authenticate the user and permit the eSIM swap.

2. The computer-readable storage medium of claim 1, comprising instructions to:
receive a visual recording of the ID associated with the user;
perform optical character recognition associated with the visual recording;
based on the optical character recognition, extract information about the user including a name associated with the user, and a visual representation associated with the user;
retrieve a stored name associated with the user, and a stored visual representation associated with the user;
determine whether the name associated with the user and the stored name associated with the user match;
determine whether the visual representation associated with the user and the stored visual representation associated with the user match;
upon determining that the name associated with the user and the stored name associated with the user match, and that the visual representation associated with the user and the stored visual representation associated with the user match, store the visual recording of the ID associated with the user; and
upon determining that the name associated with the user and the stored name associated with the user match, and that the visual representation associated with the user and the stored visual representation associated with the user match, authenticate the user.

3. The computer-readable storage medium of claim 1, comprising instructions to:
receive a visual recording of the user's face;
transform the visual recording of the user's face into a mathematical non-reversible model of the user's face;
retrieve a stored mathematical non-reversible model of a face;
determine whether the mathematical non-reversible model of the user's face and the stored mathematical non-reversible model of the face match by comparing the mathematical non-reversible model of the user's face and the stored mathematical non-reversible model of the face; and
upon determining that the mathematical non-reversible model of the user's face and the stored mathematical non-reversible model of the face match, authenticate the user.

4. The computer-readable storage medium of claim 1, wherein the instructions to perform a liveness check associated with the visual ID comprise instructions to:
record a video of the visual ID;
determine whether the visual ID is an image by:
instructing the user to perform a predetermined action associated with the user's head;
based on the video, determine whether the user is performing the predetermined action; and
upon determining that the user is performing the predetermined action, determine that the visual ID is the live version of the visual ID.

5. The computer-readable storage medium of claim 1, wherein the instructions to perform a liveness check associated with the visual ID comprise instructions to:
record a video of the visual ID;
determine whether the visual ID is an image by detecting a presence of a hologram in the visual ID, wherein the detecting of the presence of a hologram includes:
detecting a shifting glare on a surface of the ID in the video; and
upon detecting the shifting glare on the surface of the ID in the video, determine that the visual ID is a live version of the visual ID.

6. The computer-readable storage medium of claim 1, comprising instructions to:
retrieve authenticators associated with the user,
wherein the authenticators include a password, an email address associated with the user, a fingerprint associated with the user, a photo of the ID associated with the user, or a facial representation associated with the user;
enable the user to select at least one of the authenticators associated with the user;
receive an authenticator selection from the user; and
authenticate the user based on the authenticator selection.

7. A system comprising:
at least one hardware processor; and
at least one non-transitory memory storing instructions, which, when executed by the at least one hardware processor, cause the system to:
receive an indication of a sensitive operation;
obtain a unique ID of a UE associated with a user;
based on the unique ID of the UE, retrieve a visual authentication method,
wherein the visual authentication method includes a visual ID,
wherein the visual ID includes an ID associated with the user or the user's face;
record the visual ID;
retrieve a corresponding stored visual ID;
perform a liveness check associated with the visual ID, wherein the liveness check determines whether the visual ID is a recording or a live version of the visual ID, by:
recording a video of the visual ID;
determining whether the visual ID is an image by detecting movements associated with the visual ID within the video; and
upon detecting the movements associated with the visual ID within the video, determine that the visual ID is a live version of the visual ID;
upon determining that the visual ID is the recording, refuse to authenticate the user;
upon determining that the visual ID is the live version of the visual ID, compare the visual ID and the corresponding stored visual ID to determine whether the visual ID and the corresponding stored visual ID match; and
upon determining that the visual ID and the corresponding stored visual ID match, authenticate the user.

8. The system of claim 7, comprising instructions to:
receive a visual recording of the ID associated with the user;
perform optical character recognition associated with the visual recording;
based on the optical character recognition, extract information about the user including a name associated with the user, and a visual representation associated with the user;
retrieve a stored name associated with the user, and a stored visual representation associated with the user;
determine whether the name associated with the user and the stored name associated with the user match;
determine whether the visual representation associated with the user and the stored visual representation associated with the user match;
upon determining that the name associated with the user and the stored name associated with the user match, and that the visual representation associated with the user and the stored visual representation associated with the user match, store the visual recording of the ID associated with the user; and
upon determining that the name associated with the user and the stored name associated with the user match, and that the visual representation associated with the user and the stored visual representation associated with the user match, authenticate the user.

9. The system of claim 7, comprising instructions to:
receive a visual recording of the user's face;
transform the visual recording of the user's face into a mathematical non-reversible model of the user's face;
retrieve a stored mathematical non-reversible model of a face;
determine whether the mathematical non-reversible model of the user's face and the stored mathematical non-reversible model of the face match by comparing the mathematical non-reversible model of the user's face and the stored mathematical non-reversible model of the face; and
upon determining that the mathematical non-reversible model of the user's face and the stored mathematical non-reversible model of the face match, authenticate the user.

10. The system of claim 7, wherein the instructions to perform a liveness check associated with the visual ID comprise instructions to:
record a video of the visual ID;
determine whether the visual ID is an image by:
instructing the user to perform a predetermined action associated with the user's head;
based on the video, determine whether the user is performing the predetermined action; and
upon determining that the user is performing the predetermined action, determine that the visual ID is the live version of the visual ID.

11. The system of claim 7, wherein the instructions to perform a liveness check associated with the visual ID comprise instructions to:
record a video of the visual ID;
determine whether the visual ID is an image by detecting a presence of a hologram in the visual ID, said detecting the presence of a hologram including:
detecting a shifting glare on a surface of the ID in the video; and
upon detecting the shifting glare on the surface of the ID in the video, determine that the visual ID is a live version of the visual ID.

12. The system of claim 7, comprising instructions to:
retrieve authenticators associated with the user,
wherein the authenticators include a password, an email address associated with the user, a fingerprint associated with the user, a photo of the ID associated with the user, or a facial representation associated with the user;
enable the user to select at least one of the authenticators associated with the user;
receive an authenticator selection from the user; and
authenticate the user based on the authenticator selection.

13. A system comprising:
at least one hardware processor; and
at least one non-transitory memory storing instructions, which, when executed by the at least one hardware processor, cause the system to:
receive an indication that a user wants to enroll in an additional authentication program;
obtain a profile associated with the user, wherein the profile includes a first multiplicity of identifiers associated with the user, by:
determining whether the profile associated with the user exists within a wireless telecommunication network; and
upon determining that the profile associated with the user exists within the wireless telecommunication network, authenticate that the user is authorized to modify the profile;
make a recording of an ID associated with the user;
perform optical character recognition associated with the recording of the ID associated with the user;
based on the optical character recognition, generate a second multiplicity of identifiers associated with the user,
wherein the second multiplicity of identifiers at least partially overlaps the first multiplicity of identifiers;
determine whether the ID associated with the user is valid by comparing the first multiplicity of identifiers associated with the user to the second multiplicity of identifiers associated with the user to determine whether the first multiplicity of identifiers matches the second multiplicity of identifiers;
upon determining that the first multiplicity of identifiers matches the second multiplicity of identifiers, determine that the ID associated with the user is valid; and
store the second multiplicity of identifiers in the profile associated with the user.

14. The system of claim 13, wherein instructions to obtain a profile associated with the user comprise instructions to:
determine whether the profile associated with the user exists within a wireless telecommunication network; and
upon determining that the profile associated with the user does not exist within the wireless telecommunication network, create a new profile associated with the user.

15. The system of claim 13, comprising instructions to:
extract a barcode contained in the recording of the ID;
extract text contained in the recording of the ID;
compare information included in the barcode to information included in the text;
determine whether the information included in the barcode does not match the information included in the text;

upon determining that the information included in the barcode does not match the information included in the text, determine that the ID associated with the user is a fraud; and upon determining that the information included in the barcode matches the information included in the text, determine that the ID associated with the user is valid.

16. The system of claim 13, comprising instructions to:

based on the optical character recognition, determine an entity issuing the ID associated with the user;

retrieve from a database associated with the entity a third multiplicity of identifiers associated with the user;

determine whether the second multiplicity of identifiers and the third multiplicity of identifiers match by comparing the second multiplicity of identifiers associated with the user to the third multiplicity of identifiers associated with the user;

upon determining that the second multiplicity of identifiers and the third multiplicity of identifiers match, determine that the ID associated with the user is valid.

17. The system of claim 13, comprising instructions to:

obtain a recording of the user's face;

generate a mathematical non-reversible model of the user's face based on the recording; and store the mathematical non-reversible model of the user's face in the profile associated with the user.

* * * * *